W. L. NINOW.
CLOSET HANGING DEVICE.
APPLICATION FILED JAN. 15, 1918.
1,325,036.
Patented Dec. 16, 1919.
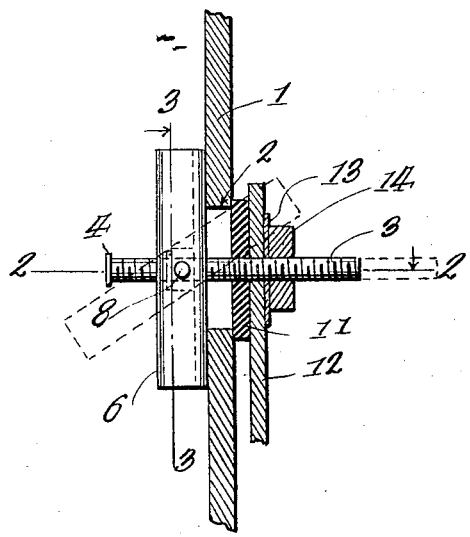
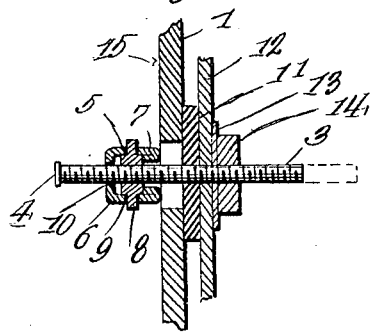
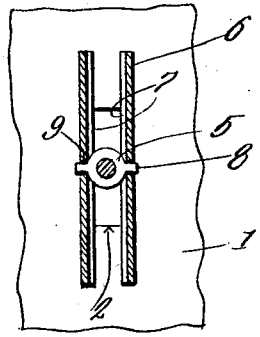
INVENTOR
Walter L. Ninow
WITNESSES
Guy M. Spring
Irving T. McCathran
BY Richard B. Owen.
ATTORNEY

UNITED STATES PATENT OFFICE.

WALTER L. NINOW, OF MILWAUKEE, WISCONSIN.

CLOSET HANGING DEVICE.

1,325,036.  Specification of Letters Patent.  Patented Dec. 16, 1919.

Application filed January 15, 1918. Serial No. 211,985.

*To all whom it may concern:*

Be it known that I, WALTER L. NINOW, a citizen of the United States, residing at Milwaukee, in the county of Milwaukee and State of Wisconsin, have invented certain new and useful Improvements in Closet Hanging Devices, of which the following is a specification.

This invention relates to closet hanging devices and has for its object the production of a simple and efficient closet hanging device which may be efficiently and conveniently inserted through a supporting partition so as to prevent the securing or hanger bolts from being accidentally forced from the tank behind the partition.

Another object of this invention is the production of a simple and efficient means for facilitating the attachment of a closet tank to a partition and firmly binding the same against shifting movement upon the partition.

With these and other objects in view this invention consists of certain novel constructions, combinations and arrangements of parts as will be hereinafter fully described and claimed.

In the drawings:

Figure 1 is a vertical section through the partition, certain portions of the hanging device being also shown in section, Fig. 2 is a section taken on line 2—2 of Fig. 1, Fig. 3 is a section taken on line 3—3 of Fig. 1.

By referring to the drawing, it will be seen that 1 designates the partition which is provided with an enlarged aperture 2 formed therein, within which aperture 2 extends the securing bolt 3. This securing bolt 3 is provided with a flat head portion 4 upon the outer end thereof and this bolt 3 extends through a journal nut 5 as shown clearly in Fig. 2 of the drawing. A retaining plate 6 is carried by the bolt 3 and is preferably substantially U-shaped in cross section, having inner side edges folded inwardly for the purpose of producing a ledge portion 7 along the inner edge of the plate 6. The journal nut 5 is adapted to bear against the inner edge of the ledge portion 7 which is formed upon the side edges of the substantially U-shaped retaining plate 6 as shown in Fig. 2 and the nut 5 will constitute means for limiting the longitudinal movement of the retaining bolt 3 through the retaining plate 6, under normal conditions. These portions 7 will also constitute an efficient support or bearing against which the journal nut 5 is adapted to rest, thereby relieving considerable strain from the laterally extending journal portion 8 of the nut 5, these journal portions 8 extending through enlarged apertures 9 formed in the side walls of the plate 6. These apertures 9 are of sufficient size to allow slight play of the journal portion 8 within the apertures but are sufficiently tight to prevent the journal portions 8 being accidentally removed therefrom.

The retaining plate 6 is provided with an enlarged aperture 10 upon the outer face thereof, through which aperture 10 is adapted to extend the securing screw 3. This securing screw 3 as above stated is provided with an enlarged head 4, and the aperture 10 is sufficiently large to permit the enlarged head 4 to extend through the aperture. The enlarged head 4, however, will prevent the longitudinal movement of the screw 3 through the nut 5 in one direction to such an extent as to cause the bolt 3 to be moved from the nut 5. By screwing the bolt 3 through the nut 5 until the head 4 passes through the aperture 10 and contacts with the nut, the retaining plate 3 may be swung at an angle as indicated in dotted lines in Fig. 1.

A washer preferably formed of metal such as iron and the like, is threaded upon the bolt 3 upon the outer face of the partition 1 and engages the opposite face thereof with respect to the retaining plate 6. This washer 11 will limit the longitudinal movement of the bolt 3 after the same has been set upon the retaining plate 6. The washer 11 is of greater size than the aperture 2 formed in the partition 8 so as to constitute a sufficient support for the bolt 3 for holding the bolt in a set position. The bolt 3 extends through the closet tank 12 as shown in Figs. 1 and 2 and a suitable washer 13 is placed upon the bolt 3, a locking nut 14 also being threaded upon the inner end of the bolt 3 for the purpose of firmly binding the washer 13 in engagement with the tank 12 and also firmly drawing the retaining plate 6 in firm engagement with the inner face 15 of the partition 1.

It has been found by actual experience that many of the supporting bolts of the closet tank and the like are accidentally dropped or lost behind the partition 1 due to the fact that the bolt 3 drops out of engagement with the tank and falls through the aperture 2 formed in the partition 1. In order to overcome this difficulty, the device illustrated and described has been produced and by means of the present device, each of the bolts 3 may be carried by the tank 12 by being secured thereon by means of the nut 14 and the bolt 3 may be threaded through the nut 5 for the purpose of withdrawing the enlarged head 4 into the substantially U-shaped retaining plate 6 and through the aperture 10, thereby permitting the retaining plate 6 to be swung at an angle with respect to the bolt 3 as shown in dotted lines in Fig. 1. When the plate 6 is swung at an angle as shown in dotted lines, the plate may be easily inserted through the aperture 2 by passing the same endwise through the aperture and after the plate has been extended to the desired position, the plate may be then swung to a position at right angles through the bolt 3, whereupon the bolt 3 may be threaded again in the opposite direction through the journal nut 5 for causing the inner end of the bolt 3 to project through the aperture 10. In this way the retaining plate 6 will be held at right angles to the securing or supporting bolt 3. The nut 14 may then be firmly clamped in engagement with the plunger 13 by threading the same upon the bolt 3 and at the same time drawing the inner edges of the retaining plate 6 in engagement with the inner face 15 of the partition 1.

From the foregoing description it will be seen that a very simple and efficient means has been produced for the purpose of attaching a closet tank to a partition and supporting the same firmly thereon without the possibility of losing the securing or supporting bolt by passing the same through the securing or supporting partition. By further considering the device, it will be seen that a very efficient device has been produced which does not contain any parts which will be likely to get out of order while the device is in operation.

It should be of course understood that certain obvious mechanical changes may be made in the present device without departing from the spirit of the invention, so long as these changes fall within the scope of the appended claim.

What is claimed is:

In combination with a threaded bolt, and a nut thereon, of a substantially U-shaped retaining plate provided with inwardly folded marginal edges for reinforcing the sides of said retaining plate, means for journaling said nut upon said retaining plate, a yieldable washer adapted to be fitted over the outer end of said bolt and adapted to rest firmly against the sides of a support, and a clamping nut threaded upon the outer end of said bolt and adapted to firmly clamp said retaining plate and resilient washer against a suitable support.

In testimony whereof I affix my signature in presence of two witnesses.

WALTER L. NINOW.

Witnesses:
 HENRY W. KOLBE,
 HERMAN REETZ.